(12) United States Patent
Takashima et al.

(10) Patent No.: US 10,843,383 B2
(45) Date of Patent: Nov. 24, 2020

(54) RUBBER COMPOSITION

(71) Applicant: CANON KABUSHIKI KAISHA, Tokyo (JP)

(72) Inventors: Kenji Takashima, Numazu (JP); Tetsuo Hino, Yamato (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 791 days.

(21) Appl. No.: 15/151,893

(22) Filed: May 11, 2016

(65) Prior Publication Data

US 2016/0347938 A1     Dec. 1, 2016

(30) Foreign Application Priority Data

May 29, 2015  (JP) ................................ 2015-109853

(51) Int. Cl.
*B29B 7/14* (2006.01)
*C08L 9/06* (2006.01)
(Continued)

(52) U.S. Cl.
CPC ........ *B29B 7/14* (2013.01); *C08L 9/02* (2013.01); *C08L 9/06* (2013.01); *B29K 2009/00* (2013.01); *B29K 2995/0041* (2013.01)

(58) Field of Classification Search
CPC ..... B29B 7/14; C08L 9/00; C08L 9/02; C08L 9/06; C08L 27/16; C08L 23/06; C08L 59/00; B29K 2009/00; B29K 2995/0041
See application file for complete search history.

(56) References Cited

U.S. PATENT DOCUMENTS 5,130,376 A *  7/1992  Shih .................. B29O 67/24
                                                      525/240
6,037,418 A    3/2000  Mukai et al.
(Continued)

FOREIGN PATENT DOCUMENTS

JP      9-118778 A     5/1997
JP      10-265616 A    10/1998
(Continued)

OTHER PUBLICATIONS

Decision of Refusal in Japanese Application No. 2015-109853 (dated Mar. 12, 2019).
(Continued)

*Primary Examiner* — Frank J Vineis
*Assistant Examiner* — Laura B Figg
(74) *Attorney, Agent, or Firm* — Venable LLP

(57) ABSTRACT

Provided is a rubber composition for producing a rubber molded article that is improved in fouling resistance while being reduced in tackiness and frictional force despite the presence of the rubber in its surface. The rubber composition includes: a rubber A; and a plastic B, in which: the rubber A includes a non-fluorine-based rubber material; a difference in elastic modulus between the rubber A and the plastic B is 50 MPa or more; a sea-island structure having a sea portion containing the rubber A and a plurality of island portions each containing the plastic B is formed; the plastic B is contained at a content of more than 0 vol % and 50 vol % or less with respect to a total amount of the rubber A and the plastic B; and 90% or more of the plurality of island portions each have a volume of 4,000 $\mu m^3$ or less.

9 Claims, 2 Drawing Sheets

(51) Int. Cl.
*C08L 9/02* (2006.01)
*B29K 9/00* (2006.01)

(56) References Cited

U.S. PATENT DOCUMENTS

| | | | |
|---|---|---|---|
| 6,328,681 B1* | 12/2001 | Stephens | D21G 1/0233 492/56 |
| 2003/0138655 A1* | 7/2003 | Watanabe | B60S 1/38 428/523 |
| 2009/0312168 A1* | 12/2009 | Ruotsi | D21F 3/08 492/56 |
| 2010/0283000 A1* | 11/2010 | Shimizu | B29B 7/42 252/74 |

FOREIGN PATENT DOCUMENTS

| | | |
|---|---|---|
| JP | 2003-183468 A | 7/2003 |
| JP | 2010-155953 A | 7/2010 |

OTHER PUBLICATIONS

Engineering ToolBox, (2003). Young's Modulus—Tensile and Yield Strength for common Materials. [online] Available at: https://www.engineeringtoolbox.com/young-modulus-d_417.html [Accessed Dec. 4, 2018].

Notification of Reasons for Refusal in Japanese Application No. 2015-109853 (dated Nov. 20, 2018).

\* cited by examiner

RUBBER COMPOSITION

BACKGROUND OF THE INVENTION

Field of the Invention

The present invention relates to a rubber composition.

Description of the Related Art

A rubber has been widely industrially utilized in various fields, such as a tire, a belt, a packing, a window frame, shoes, a hose, and a wire coating, because of its flexibility. Further, for example, the following attempts have been vigorously made in recent years. A plurality of materials are replaced with one rubber through the adjustment of the impact resistance, thermal conductivity, electrical characteristics, magnetic characteristics, and the like of the rubber itself, or a portion in which no rubber has been used is replaced with a rubber material.

Meanwhile, the rubber has, as one of its features, the following tackiness. The rubber has a low surface sliding property and hence sticks to any other substance when brought into contact therewith. The adsorption of impurities, such as contaminants, occurs in the surface of the rubber owing to the tackiness. In addition, the adsorption of the contaminants to the surface of the rubber may inhibit the exhibition of the characteristics intrinsic to the rubber.

In view of the foregoing, an attempt has heretofore been made to prevent the adsorption of the contaminants in the surface of the rubber, i.e., to improve its fouling resistance. For example, an attempt has been made to reduce opportunities for contact with the contaminants or an area of contact between the surface and the contaminants through the provision of the surface with an irregular structure. However, the attempt is not suitable for the case where the smoothness of the surface is required. A method involving arranging a coating layer that suppresses the tackiness on the surface has also been performed. However, when the characteristics are exhibited by the contact of the rubber itself with a counterpart, the coating layer serves as an obstacle. Therefore, it has been necessary to improve the fouling resistance while causing the rubber itself to appear in the surface.

In Japanese Patent Application Laid-Open No. 2003-183468, there is a disclosure of a fluororubber containing fluorine-based polymer particles. While the adhesion of contaminants is suppressed by producing the rubber itself from a fluorine-based material, the hardness of the rubber is increased by dispersing the particles. In Japanese Patent Application Laid-Open No. 2003-183468, however, no rubber composition other than the combination of the fluorine-based rubber and the fluorine-based polymer particles is obtained because the fluorine-based polymer particles are dispersed by utilizing an affinity between the fluororubber and each of the fluorine-based polymer particles.

As is understood from the foregoing, a rubber composition using a rubber that is not a fluorine-based rubber as a parent material, the rubber composition having the following features, has not heretofore been obtained. The rubber composition has a smooth surface, and under a state in which the rubber itself appears in a plane, such as the surface, while a coating layer that suppresses tackiness is absent on the surface, the rubber composition is excellent in fouling resistance.

SUMMARY OF THE INVENTION

The present invention provides a rubber composition for producing a rubber molded article that does not lose any general characteristic of a rubber, and is improved in fouling resistance while being reduced in tackiness and frictional force despite the presence of the rubber in its surface. It should be noted that in the present invention, the terms "fouling resistance" and "antifouling property" include a concept of "dust-proof property."

According to one embodiment of the present invention, there is provided a rubber composition, including: a rubber A; and a plastic B, in which: the rubber A includes a non-fluorine-based rubber material; a difference in elastic modulus between the rubber A and the plastic B is 50 MPa or more; a sea-island structure having a sea portion containing the rubber A and a plurality of island portions each containing the plastic B is formed; the plastic B is contained at a content of more than 0 vol % and 50 vol % or less with respect to a total amount of the rubber A and the plastic B; and 90% or more of the plurality of island portions each have a volume of 4,000 $\mu m^3$ or less.

Further features of the present invention will become apparent from the following description of exemplary embodiments with reference to the attached drawings.

DESCRIPTION OF THE EMBODIMENTS

Figure 1:
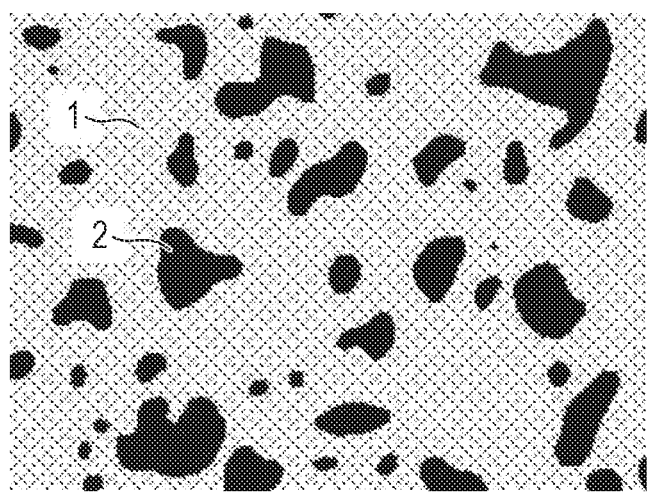
FIG. 1 is a partially enlarged view for illustrating part of a rubber molded article of the present invention.

Embodiments of the present invention are described in detail below. A well-known or known technology in the art is applicable to a part not particularly illustrated in the drawings or a part not particularly described in the following description.

(Rubber Composition)

A rubber composition of the present invention is a rubber composition including a rubber A and a plastic B. In the present invention, the rubber A is a non-fluorine-based rubber material. In the present invention, a difference in elastic modulus between the rubber A and the plastic B is 50 MPa or more. In the rubber composition of the present invention, a sea-island structure having a sea portion containing the rubber A and a plurality of island portions each containing the plastic B is formed. In the present invention, the plastic B is contained at a content of more than 0 vol % and 50 vol % or less with respect to the total amount of the rubber A and the plastic B, and 90% or more of the plurality of island portions each have a volume of 4,000 $\mu m^3$ or less.

The rubber composition of the present invention is described in detail below.

(1) Rubber A

The rubber A in the rubber composition of the present invention is a non-fluorine-based rubber material free of a fluorine atom itself and a functional group having a fluorine atom on the main chain and side chains of a molecule thereof. The kind of the rubber A is not particularly limited as long as the rubber is free of a fluorine atom and a functional group containing a fluorine atom on the main chain and side chains of the molecule. In the present invention, a conventionally known rubber material can be used as the rubber A, and one kind of such rubber materials may be used alone, or two or more kinds of the rubber materials may be used in combination. In addition, the rubber material to be used as the rubber A may contain fine particles or a conventionally known inorganic filler. When the term "rubber" is used in the following description unless otherwise stated, the rubber refers to a rubber free of a fluorine atom in the structure of a molecule thereof. Of the rubber materials to be used as the rubber A, a synthetic rubber is preferred. This is because of the following reason: in the case of the synthetic rubber, when the plastic B to be described later is added, its affinity for the plastic B can be appropriately adjusted. Of the synthetic rubbers to be used as the rubber A, a diene-based synthetic rubber is preferred. This is because the diene-based synthetic rubber has a double bond on the main chain of the polymer and is rich in chemical reactivity, and hence a posttreatment therefor, such as vulcanization, is easy. Of the synthetic rubbers, a butadiene-based rubber, such as a nitrile rubber (NBR) or a styrene rubber (SBR), is more preferred. The characteristics of the butadiene-based rubber, such as its compatibility with the plastic B, are easily adjusted merely by changing the polymerization ratio of the rubber. In addition, the butadiene-based rubber has many advantages. For example, the compatibility of the rubber with the plastic B to be added is easily controlled, the rubber has resistance to heat to be applied in a treatment involving adding the plastic B, and the rubber is easily available at low cost. The rubber A may be subjected to a vulcanization treatment or may be unvulcanized. Even when the vulcanization treatment is performed under a state in which the plastic B is contained in the rubber A, the dispersed state of the plastic B does not change. In addition, the performance of the vulcanization treatment changes the hardness of only the rubber A.

(2) Plastic B

The plastic B in the rubber composition of the present invention is a solid that contains a polymer substance as a main raw material and is artificially formed into a useful shape as defined in JIS K 6900. In the present invention, the kind of the plastic B is not particularly limited. The plastic is preferably a thermoplastic plastic. This is because the thermoplastic plastic has the following advantages: the plastic is easily processed at the time of its incorporation into the rubber A; and the tackiness and dynamic friction coefficient of the plastic are lower than those of the rubber A. The plastic is more preferably a crystalline plastic. This is because the performance of the crystalline plastic, such as heat resistance or a mechanical strength, is more excellent than that of an amorphous plastic. The plastic is still more preferably an engineering plastic selected from, for example, ultrahigh-molecular weight polyethylene (UHPE), polyvinylidene fluoride (PVDF), and polyoxymethylene (POM). This is because the engineering plastic hardly deteriorates even when continuously used under a state in which its use temperature is 100° C. or more. This is also because the engineering plastic has, for example, the following advantages: the plastic has a high sliding property because the plastic is used as a sliding member; the tackiness and friction coefficient of the plastic are extremely low; and the plastic is excellent in chemical resistance and heat resistance, and has high environmental stability. In the present invention, one kind of plastics each serving as the plastic B may be used alone, or two or more kinds thereof may be used in combination. When the term "friction coefficient" is used in the following description unless otherwise stated, the term refers to a dynamic friction coefficient.

In the present invention, the plastic B is contained, i.e., is contained at a ratio of more than 0 vol % with respect to the total amount of the rubber A and the plastic B. Accordingly, when the rubber composition of the present invention is molded into a certain shape, reductions in tackiness and frictional force, and an improvement in fouling resistance in a predetermined plane are achieved. However, the content of the plastic B with respect to the total amount of the rubber A and the plastic B is 50 vol % or less because a main component for the rubber composition of the present invention is the rubber A.

(3) Elastic Modulus

In the rubber composition of the present invention, the elastic modulus of the rubber A is preferably more than 0 MPa and less than 50 MPa. This is because when the elastic modulus of the rubber A is 50 MPa or more, the flexibility and elasticity of the rubber become poor, and hence it becomes difficult for the rubber to follow the shape of any other material in some cases. The elastic modulus of the rubber A is more preferably more than 0 MPa and 20 MPa or less. When the elastic modulus of the rubber A is 20 MPa or less, the flexibility is improved, and hence it becomes easy for the rubber to be used in a special shape after its molding, or to be brought into contact with any other substance while changing its shape following the shape of the substance. In addition, even when a state in which the rubber takes the special shape is maintained for a long time period, the deterioration of the rubber hardly occurs. The elastic modulus of the rubber A is still more preferably more than 0 MPa and 10 MPa or less. When the elastic modulus of the rubber A is 10 MPa or less, at the time of the addition of the plastic B, the rubber A is brought into close contact with the plastic B following the shape of the plastic B, and hence no peeling occurs between the rubber A and the plastic B.

In the rubber composition of the present invention, the elastic modulus of the plastic B portion is preferably 100 MPa or more. When the elastic modulus is less than 100 MPa, the plastic B deforms following the deformation of the rubber A portion at the time of the contact of any other substance with a predetermined plane of a molded article obtained by molding the rubber composition, and hence an area of contact therebetween increases. Accordingly, a reduction in tackiness or friction coefficient does not sufficiently occur in the predetermined plane. The elastic modulus of the plastic B portion is more preferably 200 MPa or more. When the elastic modulus of the plastic B portion is 200 MPa or more, at the time of the contact of the other substance with the predetermined plane of the molded article, contact with the plastic B that more hardly deforms than the rubber A does becomes dominant. The elastic modulus of the plastic B portion is still more preferably 500 MPa or more. When the elastic modulus of the plastic B portion is 500 MPa or more, the friction coefficient of the predetermined plane of the molded article is reduced by the hardness of the plastic itself. In addition, the deformation and the follow at the time of the contact of the molded article with the other substance are suppressed, and hence the tackiness of the molded article reduces.

In the rubber composition of the present invention, an elastic modulus difference $\Delta D$ between the rubber A and the plastic B is 50 MPa or more. When the $\Delta D$ is less than 50 MPa, the deformation of the plastic B occurs following the deformation of the rubber A at the time of the contact of any other substance with a predetermined plane of a molded article obtained by molding the rubber composition, and hence an area of contact therebetween increases. Accordingly, a reduction in tackiness or friction coefficient of the molded article does not sufficiently occur. The $\Delta D$ is preferably 200 MPa or more. This is because when the $\Delta D$ is 200

MPa or more, at the time of the contact of the other substance with the predetermined plane of the molded article, contact with the plastic B that hardly deforms becomes dominant, and hence the tackiness and the friction coefficient reduce.

(4) Sea-Island Structure

In the rubber composition of the present invention, the sea-island structure having the sea portion containing the rubber A and the plurality of island portions each containing the plastic B is formed. In the rubber composition of the present invention, a portion in which the sea-island structure is formed is not limited to a portion appearing in an external environment, i.e., a flat surface, a side surface, or the like that appears when the composition is molded, and the structure is formed inside the composition as well. The plastic B constituting the island portions of the sea-island structure is a plastic lump having a certain volume. In the present invention, 90% or more of the plastic lumps that exist in plurality each have a volume of 4,000 $\mu m^3$ or less. When plastic lumps each having a volume of more than 4,000 $\mu m^3$ account for more than 10% of the entirety of the plastic lumps, at the time of the bending deformation of a molded article obtained by molding the rubber composition, a large stress acts on the island portions themselves or on an interface between the sea portion and each of the island portions owing to the hardness of the plastic B itself. Thus, the breakage of the plastic B or the peeling of the plastic B from the rubber A occurs.

(5) Other Component

The rubber composition of the present invention includes at least the rubber A and the plastic B, and a component except the rubber A and the plastic B may be added to the extent that the physical properties of the rubber composition itself are not impaired. When the component except the rubber A and the plastic B, i.e., the so-called other component is added to the rubber composition of the present invention, the other component is contained in the sea portion, or any one of the island portions, of the sea-island structure depending on its affinities for the rubber A and the plastic B, and the viscosity of the component itself at the time of its kneading.

Examples of the other component that can be contained in the rubber composition of the present invention include a carbon filler, a glass fiber powder, and a metal oxide powder.

(Rubber Molded Article)

A rubber molded article of the present invention is obtained by molding the rubber composition of the present invention. The rubber molded article of the present invention has a plane having formed thereon a sea-island structure having a sea portion containing the rubber A and a plurality of island portions each containing the plastic B. The term "plane" as used herein refers to a plane required to have tackiness, a frictional force, and fouling resistance out of the planes that appear when the rubber composition of the present invention is molded. In addition, the term "plane" as used herein is not limited to the entirety of one plane defined as a flat surface or a side surface, and includes part of the one plane as well. In the present invention, in the plane, the ratio of the areas of the island portions to the sum of the area of the sea portion and the areas of the island portions is more than 0% and 50% or less. In addition, in the plane, island portions each having an area of more than 0 $\mu m^2$ and 300 $\mu m^2$ or less out of the plurality of island portions account for 90% or more of the total area of the island portions.

FIG. 1 is a partially enlarged view for illustrating part of the rubber molded article of the present invention. More specifically, FIG. 1 is an enlarged view of one of the planes of the rubber molded article of the present invention. As illustrated in FIG. 1, the rubber molded article of the present invention has at least one plane having formed thereon a sea-island structure having a sea portion 1 and island portions 2.

In the rubber molded article of the present invention, in the plane having the sea-island structure, the ratio of the areas of the island portions to the sum of the area of the sea portion and the areas of the island portions is more than 0% and 50% or less. When the island portions each containing the plastic B are present, albeit slightly, in the sea portion containing the rubber A in the plane of interest, reductions in tackiness and friction coefficient are observed in the plane. However, when the ratio of the areas of the island portions is more than 50% in the plane of interest, the rubber A is embedded in the plastic B and hence the characteristics of the rubber molded article cannot be sufficiently exhibited. In the present invention, the ratio of the areas of the island portions to the sum of the area of the sea portion and the areas of the island portions in the plane of interest is preferably 10% or more and 35% or less. When the ratio of the areas of the island portions becomes 10% or more, the deformation of the rubber molded article itself at the time of the contact of the rubber molded article with any other substance in the plane of interest can be suppressed. Even when the contact as used herein is contact between the rubber A and the other substance, the deformation and follow of the rubber molded article itself can be suppressed. In addition, when the ratio of the areas of the island portions is 35% or less, a reduction in number of the irregularities of the plane of interest resulting from a reduction in amount of the plastic B having a relatively high elastic modulus occurs, and hence the frequency at which contaminants each having a size of ten and several micrometers are trapped in the irregularities of the plane reduces.

In the rubber molded article of the present invention, in the plane having the sea-island structure, the island portions each having an area of more than 0 $\mu m^2$ and 300 $\mu m^2$ or less out of the plurality of island portions each containing the plastic B account for 90% or more of the total area of the island portions. When the number of the island portions each having an area of more than 300 $\mu m^2$ is large, at the time of the bending deformation of the rubber molded article, a large stress acts on the island portions themselves or on an interface between the sea portion and each of the island portions owing to the hardness of the plastic B itself. Thus, the breakage of the island portions or the peeling of the island portions from the sea portion occurs. In the present invention, the area of each of all the island portions each containing the plastic B is preferably more than 0 $\mu m^2$ and 300 $\mu m^2$ or less.

When the plastic B is contained in a minute size into the rubber molded article while satisfying such relationships as described above, the molded article shows values much lower than tackiness and a friction coefficient conceivable from the content of the plastic B. Although the mechanism of the phenomenon has not been completely elucidated, the following hypothesis is made. The friction coefficient of the entirety of the molded article is reduced by the low tackiness and low friction coefficient of the plastic B itself dispersed in a minute size. In addition to the foregoing, the fact that the plastic B is distributed in a minute size and the fact that the plastic has hardness affect the friction coefficient. When the plastic B is distributed in a minute size in the rubber molded article, despite the fact that the area of a portion in which the rubber molded article is actually brought into contact with a counterpart material is small, the number of opportunities for the plastic B to be present in the contact portion, i.e., a plane in contact with the counterpart material increases. In addition, the plastic B is distributed in a minute size and the plastic itself is hard. Accordingly, first, when the counterpart material is brought into contact with the molded article, the counterpart material is blocked by the plastic B, and hence the counterpart material is suppressed from being brought into contact therewith in such a manner as to bite into the rubber (rubber A). In addition, when the counterpart material and the rubber molded article are brought into contact with each other, the hard plastic B distributed in the plane in contact with the counterpart material plays such a role as to hold the rubber A from its surroundings even at the time of the peeling of the counterpart material from the rubber molded article, thereby suppressing the rubber molded article from following the counterpart material. Any one of the plurality of actions and effects described above may occur, or a combination of two or more of the actions and effects may occur.

In the rubber molded article of the present invention, in the plane having the sea-island structure, a surface roughness Ra of the plane is preferably more than 0 μm and 3 μm or less. When the Ra is more than 3 μm, the surface shape of the plane may be responsible for the adhesion of contaminants. The Ra is more preferably more than 0 μm and 2 μm or less. In the rubber molded article of the present invention, the Ra is determined in consideration of the rubber A and the plastic B that appear in the plane.

Incidentally, the sea-island structure observed in a predetermined plane of the rubber molded article of the present invention is present in a depth (thickness) direction of the molded article as well. Accordingly, even after part of the rubber A and the plastic B present in the predetermined plane have been shaved off by abrasion, the sea-island structure can be observed in the predetermined plane. In addition, the surface state of the predetermined plane is changed by the abrasion. Particularly when the Ra is 3 μm or less after the surface state has been changed by the abrasion, reductions in tackiness and frictional force, and an improvement in fouling resistance are achieved in the predetermined plane by satisfying the predetermined conditions for the island portions in the sea-island structure of the predetermined plane.

In the sea-island structure appearing in the predetermined plane of the rubber molded article, a relationship between the islands each containing the plastic B is not particularly limited, but an average inter-adjacent wall surface distance $D_n$ is available as a parameter representing the relationship. The average inter-adjacent wall surface distance $D_n$ is obtained by: calculating a distance between each of the islands and a counterpart whose walls are closest to each other as an inter-adjacent wall surface distance; and averaging the calculated values. Therefore, a counterpart serving as an object of an inter-adjacent wall surface distance from one island X is one island Y alone. However, a counterpart island serving as an object of an inter-adjacent wall surface distance from the counterpart island Y is not necessarily the island X. In the present invention, the $D_n$ is preferably more than 0 μm and 10 μm or less. In a portion in which the island portions each containing the plastic B are adjacent to each other, the effect of the fouling resistance is large. Specifically, when the $D_n$ becomes 10 μm or less, even in the case where minute contaminants each having a size of ten and several micrometers are brought into contact with the predetermined plane of the rubber molded article, the number of opportunities for the contaminants to be brought into direct contact with the island portions each containing the plastic B in the predetermined plane increases, and hence the effect of the fouling resistance enlarges. In the present invention, the $D_n$ is more preferably more than 0 μm and 5 μm or less. When the $D_n$ is 5 μm or less, the adhesion and follow of the rubber molded article after the contact of the rubber molded article with any other substance in the predetermined plane can be suppressed by an influence of the hardness of each of the island portions between which the sea portion containing the rubber A is sandwiched. Thus, the tackiness and friction coefficient of the molded article reduce.

In the sea-island structure of the predetermined plane of the rubber molded article of the present invention, the manner in which the island portions each containing the plastic B are dispersed is not particularly limited, but an area ratio distribution degree $V_d$ is available as a parameter representing the manner. The $V_d$ is obtained by: calculating the area ratios of the island portions each containing the plastic B in an image having a certain area in the unit of %; and calculating the standard deviation of the calculated values. When the areas of the island portions each containing the plastic B in the sea-island structure of the predetermined plane are regarded as objects, the $V_d$ is obtained by calculating area ratios at 20 or more sites in, for example, a range measuring 5 μm by 5 μm. The $V_d$ is preferably more than 0 and 15 or less. When the $V_d$ is more than 15, the ratio of the island portions in the sea-island structure changes in some places, and hence a site at which the effect of the plastic B is not sufficiently obtained appears. The $V_d$ is more preferably more than 0 and 10 or less. When the $V_d$ becomes or less, the uniformity of the island portions is improved and its place dependency is eliminated, and hence when the rubber molded article is produced, the production itself becomes simple.

(Application Examples of Rubber Molded Article)

The rubber molded article of the present invention may be used in a state of being formed on, for example, a plastic substrate or a metal substrate. In addition, the rubber molded article of the present invention may be used as a skin layer for covering a core layer formed of a material except a constituent material for the rubber molded article.

(Methods of producing Rubber Composition and Rubber Molded Article)

A method of producing the rubber composition of the present invention is not particularly limited as long as a rubber composition having desired physical properties is obtained. For example, the composition is produced by a kneading treatment with an open-type mixer such as a rubber kneading roll, or a closed-system mixer such as a kneader and a screw kneading machine. A kneading treatment with a closed-system mixer that seldom involves contaminants is preferred. A kneading treatment with a kneading machine with a feedback-type screw that can repeatedly apply a larger shear force to a product to be kneaded even in a closed system is more preferred. A kneading treatment with a feedback-type screw that induces extension shear capable of applying a high shear force is still more preferred.

When the kneading treatment is performed, for example, the temperature at which the product to be kneaded is loaded, the temperature and pressure of a kneading portion, and the kneading speed of a screw or the like are appropriately adjusted so that a rubber may not deteriorate owing to heat generation caused by the application of a shear force.

A rubber composition that has already been kneaded may be subjected to a vulcanization treatment for improving the durability of a rubber portion.

The rubber composition thus obtained is processed in order that its shape may be controlled. Thus, a rubber molded article having a predetermined shape is obtained. At the time of the processing, mechanical polishing may be performed or a treatment with a chemical may be performed.

(Average Solubility Parameter)

One important factor at the time of the production of the rubber composition of the present invention is an average solubility parameter. In the present invention, a difference in average solubility parameter between the rubber A and the plastic B is preferably 14 $(J/cm^3)^{1/2}$ or less. When the difference is more than 14 $(J/cm^3)^{1/2}$, the volume of the plastic lump serving as the plastic B hardly reduces. As a result, an effect concerning a molded article obtained by molding the rubber composition reduces. The difference in average solubility parameter between the rubber A and the plastic B is more preferably 10 $(J/cm^3)^{1/2}$ or less. Here, a solubility parameter to be used in the present invention is a Hansen solubility parameter. The Hansen parameter is formed of energies formed of the dispersion force of an atom, a force occurring between the permanent dipoles of a molecule, and a hydrogen bond of the molecule, and the energies are represented by $\delta_D$, $\delta_P$, and $\delta_H$ $[(J/CM^3)^{1/2}]$, respectively. In this case, a solubility parameter $\delta$ $[(J/cm^3)^{1/2}]$ of a substance is represented by the following equation (i).

$$\delta = (\delta_D^2 + \delta_P^2 + \delta_H^2)^{1/2} [(J/cm^3)^{1/2}] \quad (i)$$

In the case of a general substance, a measured value for its Hansen parameter is obtained as a literature value, and even in the case of a special substance whose Hansen parameter is not obtained as a literature value, the parameter can be calculated with calculation software.

Incidentally, when a plurality of (e.g., two kinds of) substances are mixed, in the case where a difference in Hansen parameter between the respective substances in a mixture to be obtained is large, an energy needed for dissolving or mingling the substances increases. Accordingly, when the difference in Hansen parameter is large, the solubility of a solute in a solvent reduces and hence mingling therebetween does not proceed. Here, $|\Delta\delta(a-b)|[(J/cm^3)^{1/2}]$ serving as a difference in Hansen parameter between a substance a and a substance b is calculated from the following equation (ii).

$$|\Delta\delta(a-b)| = \{4(\delta_{aD} - \delta_{bD})^2 + (\delta_{aP} - \delta_{bP})^2 + (\delta aH - \delta_{bH})^2\}^{1/2} \quad (ii)$$

(Melt Viscosity)

One important factor at the time of the production of the rubber composition of the present invention is a melt viscosity. In order that the size of the plastic lump serving as the plastic B may be reduced at the time of its kneading, both the rubber A and the plastic B desirably soften at the time of the kneading. Most of the materials serving as the rubber A and the plastic B that can be used at the time of the production of the rubber composition of the present invention soften at about 180° C., and are often kneaded at a temperature in the vicinity thereof. The extents to which the rubber A and the plastic B soften are represented by their melt viscosities. A melt viscosity ratio serving as a ratio therebetween is necessarily 1 or more because the ratio is calculated with reference to the lower viscosity. When a plurality of materials, e.g., the rubber A and the plastic B are used, a weighted average is calculated based on their respective mixing ratios, and the value is used.

In the present invention, a ratio (melt viscosity ratio) between the melt viscosity of the rubber A at 180° C. and the melt viscosity of the plastic B at 180° C. is preferably 1 or more and 3 or less. When the melt viscosity ratio is 3 or less, in the case where a shear force at the time of the kneading is large, the size of the plastic lump serving as the plastic B is easily reduced without being affected by any other physical property value. In the present invention, the melt viscosity ratio is more preferably 1 or more and 2 or less.

(Evaluation Approach)

An approach to evaluating the rubber molded article obtained by the method described above is described below.

(1) Structural Evaluation of Plane to be evaluated of Rubber Molded Article

Drawing-based analysis is desirably performed as the structural evaluation of a plane to be evaluated of the rubber molded article, e.g., its surface. The structure can be identified through, for example, direct observation by measurement with a scanning electron microscope (SEM) or a laser microscope. Such a pretreatment as described below is performed as required: the plane to be evaluated, such as the surface, is partially polished, or a fracture surface is caused to appear. In addition, when no contrast is obtained, for example, because the density of the sea portion and the density of the island portions are substantially the same, the plane is observed after such a treatment that the sea portion and the island portions differ from each other when photographed as an image such as a dyeing treatment has been performed in advance.

In order that the sea-island structure in the plane to be evaluated of the rubber molded article may be quantized, measurement is performed with a scanning electron microscope (SEM) or a laser microscope, and the resultant image is captured in image analysis software. After that, the image is binarized so that the sea portion and the island portions may be completely separated from each other. Then, with regard to the binarized image, a correlation between the number of dots of the image and an actual size is calculated, and a desired numerical value is calculated from the image.

Incidentally, the total area of the island portions can be determined as the total sum of the areas of portions corresponding to the island portions in the binarized image. Here, all the areas of the respective islands in the image are calculated from the relationship between the number of dots of the image and the actual size, and hence the total area of the island portions can be calculated by summing these areas. In the predetermined plane of the rubber molded article of the present invention, i.e., the plane having the sea-island structure, island portions each having an area of more than 0 $\mu m^2$ and 300 $\mu m^2$ or less out of the plurality of island portions account for 90% or more of the total area of the island portions. The foregoing means that a small number of island portions each having a large area are not present in the predetermined plane of the rubber molded article of the present invention, but many island portions each having a relatively small area are present therein.

(2) Evaluation of Composition of Plane to be evaluated of Rubber Molded Article

In the rubber molded article, a method of evaluating the composition of the plane to be evaluated (e.g., the surface) is not particularly limited. For example, a method involving determining the composition from an element in the plane and the amount thereof with an energy dispersive X-ray (EDX) apparatus, or a method involving detecting the element by the mapping system of chemical bond information with a nano IR analyzer applying infrared spectroscopy to minute size measurement is available.

(3) Evaluation of Hardness of Plane to be evaluated of Rubber Molded Article

The evaluation of the hardness of the plane to be evaluated of the rubber molded article is not particularly limited. For example, the measurement of the respective elastic moduli of the sea portion and the island portions through the utilization of a nanoindentation method, or a method involving performing the in-plane mapping of the elastic moduli with an atomic force microscope (AFM) nanoindentation apparatus applying nanoindentation and an AFM is available.

A value obtained by averaging the elastic moduli of the sea portion present at a midpoint between an island portion and another island portion is defined as the hardness of the sea portion, and the hardness of each of the island portions is calculated as a value obtained by averaging the elastic moduli of the centers of the island portions. In addition, when a plurality of kinds of island portions formed of different materials are present, the average of the elastic moduli of the centers of the island portions is defined as the elastic modulus of each of the island portions no matter what kind the island portions are.

(4) Evaluation of Antifouling Property of Plane to be Evaluated of Rubber Molded Article The antifouling property of the plane to be evaluated of the rubber molded article is evaluated based on the difficulty with which any other substance adheres to the surface and the ease with which the substance leaves when brought into contact therewith. For example, the following approach is given.

(Tackiness Test)

A tackiness test involves pressing another substance against a test object and measuring a peel force when the substance is separated. The peel force is a numerical value representing the ease with which the substance is removed at the time of its adhesion. The antifouling property can be measured with a general adhesive force-measuring apparatus or a self-made apparatus. Measurement in a micro size, such as force curve measurement with an atomic force microscope (AFM), can also be performed. Here, a smaller peel force means that the fouling resistance is higher. When the contamination-preventing properties of a plurality of kinds of rubber molded article samples are compared, the comparison is performed under the same condition.

(5) Friction Test

A friction test involves bringing another substance into contact with a test object and measuring a dynamic friction coefficient from a force needed for dragging the substance while applying a load. The dynamic friction coefficient is a numerical value representing the difficulty with which the substance is caught, in other words, adheres at the time of the contact. The friction test comes in various types such as measurement involving bringing the other substance into point contact with a flat surface and measurement involving bringing the substance into surface contact therewith. The friction test involving a small contact area and a small load is desirable for the rubber molded article of the present invention because its fouling resistance is also considered. Here, a smaller friction coefficient means that the fouling resistance is higher. When the friction coefficients of a plurality of kinds of rubber molded article samples are compared, the comparison is performed under the same condition.

The present invention is described in detail below by way of Examples, but the present invention is not limited to Examples to be described below.

(Measurement and Calculation of Physical Property Values of Material)

(1) Melt Viscosity Ratio

The melt viscosities of a rubber and a plastic to be used in each of Examples under conditions at the time of their kneading were measured with CAPILOGRAPH (manufactured by Toyo Seiki Seisaku-Sho, Ltd.). A melt viscosity ratio was calculated by dividing the higher value of the resultant melt viscosities by the lower value. When the melt viscosity ratio is calculated by the calculation method, the melt viscosity ratio increases as the melt viscosities of the materials differ to a larger extent (a difference in melt viscosity between the materials becomes larger). Meanwhile, as the melt viscosities become closer to each other (the difference in melt viscosity becomes smaller), the ratio approaches 1. When a plurality of materials were used for the rubber and/or the plastic, a weighted average was calculated based on their respective mixing ratios, and the value was used.

(2) Difference in Average Solubility Parameter

The Hansen solubility parameters of the rubber and the plastic to be used in each of Examples were calculated with calculation software "HSPiP" (manufactured by Eizo Kobo Question). In addition, a difference between the resultant solubility parameters was calculated with the same software by a method based on a theory. When a plurality of materials were used for the rubber and/or the plastic, a weighted average was calculated based on their respective mixing ratios, and the value was used.

(Example 1) Production of Rubber Composition and Rubber Molded Article

A nitrile rubber (NBR) serving as the rubber A and polyvinylidene fluoride (PVDF) serving as the plastic B were prepared. In this case, a weight ratio (kneading weight ratio) between the rubber A and the plastic B was 70:30, and the total of the rubber A and the plastic B was set to 500 g. Next, in order for the prepared rubber and the prepared plastic to be physically integrated, the rubber and the plastic were loaded into a kneading machine set to 100° C. and subjected to a kneading treatment at a number of revolutions of 50 rpm for from 5 minutes to 10 minutes.

Subsequently, the kneaded product was further subjected to a kneading treatment with a high-shear molding apparatus manufactured by Niigata Machine Techno Co., Ltd. A feedback-type screw that induces extension shear was used in the kneading portion of the apparatus. Accordingly, the apparatus can apply a shear force higher than that of an ordinary biaxial kneading machine, can complete the treatment within a shorter time period than the ordinary biaxial kneading machine does, and can suppress shear heating with recirculating cooling water. Therefore, the apparatus can apply a shear force higher than that of an ordinary apparatus such as a biaxial kneading machine, and even when materials that are poorly compatible with each other are used, the apparatus can mix the materials in a minute size without deteriorating the materials. The materials loaded into the apparatus are treated in a plasticizing portion (preliminary kneading portion) to be brought into desired states, and are then introduced into the kneading portion and subjected to the treatment. In particular, the setting of the number of revolutions of the screw (affecting an applied shear rate) and a treatment time in the kneading portion largely affects the mixed state of both the substances, and hence the number of revolutions and the time were strictly controlled. In this example (Example 1), a shear rate was set to 500 rpm and a shearing treatment time at the time of the kneading was set to 10 seconds.

The temperature at which the substances were loaded, the temperature of the kneading portion, and the like were also appropriately adjusted so that the rubber did not deteriorate owing to heat generation caused by shear. In particular, the temperature in the kneading portion was adjusted to 180° C.

Each of the resultant rubber compositions was subjected to a vulcanization treatment. Specifically, zinc oxide, stearic acid, sulfur, and N-(tert-butyl)-2-benzothiazolesulfenamide were appropriately added to the rubber composition, and the mixture was kneaded with an electrically-heated high-temperature roll machine manufactured by Ikeda Kikai Kogyo Co., Ltd. under the conditions of room temperature and a number of revolutions of the roll of 25 rpm. Further, a vulcanization condition was determined by performing a vulcanization degree test in conformity with JIS K 6300-2: 2001, and press molding was performed under the condition.

Figure 2:
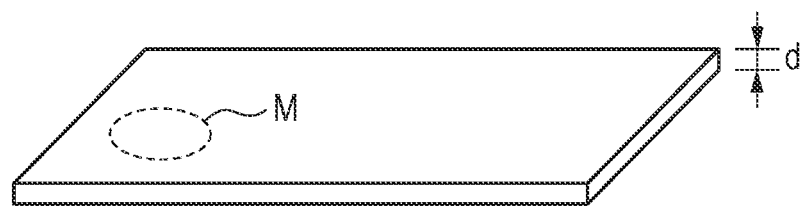
FIG. 2 is a perspective view for illustrating a sheet produced in Example 1.

A sheet-like rubber molded article of a square shape measuring 15 mm by 15 mm was obtained by the press molding. FIG. 2 is a perspective view for illustrating the sheet produced in Example 1. A region used at the time of the evaluation of any one of the smoothness, hardness, fouling resistance, and friction coefficient of the rubber molded article to be described later is represented by reference symbol M in FIG. 2. However, regions used at the time of the evaluations of the hardness, fouling resistance, and friction coefficient of the rubber molded article differ from one another. In addition, the thickness (represented by reference symbol d in FIG. 2) of the rubber molded article obtained in this example was 1.1 mm.

Example 2

A rubber molded article was obtained by the same method as that of Example 1 except that in Example 1, the weight ratio between the rubber A and the plastic B was changed as shown in Table 1 below. The thickness of the rubber molded article obtained in this example was 0.8 mm.

Example 3

A rubber molded article was obtained by the same method as that of Example 1 except that in Example 1, the kinds of the rubber A and the plastic B, and the shear rate at the time of kneading were changed as shown in Table 1 below. The thickness of the rubber molded article obtained in this example was 1.0 mm.

Example 4

A rubber molded article was obtained by the same method as that of Example 1 except that in Example 1, the kinds of the rubber A and the plastic B, and the shear rate at the time of kneading were changed as shown in Table 1 below. The thickness of the rubber molded article obtained in this example was 1.2 mm.

Example 5

A rubber molded article was obtained by the same method as that of Example 1 except that in Example 1, the kinds of the rubber A and the plastic B were changed as shown in Table 1 below. The thickness of the rubber molded article obtained in this example was 0.9 mm.

Example 6

A rubber molded article was obtained by the same method as that of Example 1 except that in Example 1, the kind of the plastic B and the shear rate at the time of kneading were changed as shown in Table 1 below. The thickness of the rubber molded article obtained in this example was 1.0 mm.

Example 7

A rubber molded article was obtained by the same method as that of Example 1 except that in Example 1, the kind of the plastic B was changed as shown in Table 1 below. The thickness of the rubber molded article obtained in this example was 1.1 mm.

Comparative Example 1

A sheet-like rubber molded article of a square shape measuring 15 mm by 15 mm was obtained by performing press molding after the vulcanization of a styrene rubber (SBR). The thickness of the rubber molded article obtained in this comparative example was 1.0 mm.

Comparative Example 2

A sheet-like rubber molded article was obtained by the same method as that of Comparative Example 1 except that in Comparative Example 1, the nitrile rubber (NBR) was used instead of the SBR. The thickness of the rubber molded article obtained in this comparative example was 1.0 mm.

Comparative Example 3

A sheet-like rubber molded article was obtained by the same method as that of Example 1 except that in Example 1, the kneading treatment with the high-shear molding apparatus was omitted. The thickness of the rubber molded article obtained in this comparative example was 1.2 mm.

TABLE 1

| | Rubber A | Plastic B | Kneading weight ratio between A and B | Shear rate [rpm] | Shearing treatment time | Viscosity ratio at 180° C. | $|\Delta\delta_{(a-b)}|$ |
|---|---|---|---|---|---|---|---|
| Example 1 | NBR | PVDF | 70:30 | 500 | 10 seconds | 1.3 | 9.0 |
| Example 2 | NBR | PVDF | 85:15 | 500 | 10 seconds | 1.3 | 9.0 |
| Example 3 | SBR | UHPE | 70:30 | 1,000 | 10 seconds | 1.7 | 3.6 |
| Example 4 | SBR | PVDF | 70:30 | 1,000 | 10 seconds | 1.3 | 7.9 |
| Example 5 | SBR | POM | 70:30 | 500 | 10 seconds | 1.3 | 10 |
| Example 6 | NBR | PVD + UHPE | 70:30 | 1,000 | 10 seconds | 1.2 | 6.7 |
| Example 7 | NBR | UHPE | 70:30 | 500 | 10 seconds | 1.0 | 4.5 |
| Comparative Example 1 | SBR | — | — | — | — | — | — |

TABLE 1-continued

|  | Rubber A | Plastic B | Kneading weight ratio between A and B | Shear rate [rpm] | Shearing treatment time | Viscosity ratio at 180° C. | $|\Delta\delta_{(a-b)}|$ |
| --- | --- | --- | --- | --- | --- | --- | --- |
| Comparative Example 2 | NBR | — | — | — | — | — | — |
| Comparative Example 3 | NBR | PVDF | 70:30 | Preliminary kneading alone | — | 1.3 | 9.0 |

NBR: Nitrile rubber (manufactured by JSR Corporation, N230SV)
SBR: Styrene rubber (manufactured by Asahi Kasei Chemicals Corporation, TUFDENE 2003)
PVDF: Polyvinylidene fluoride (manufactured by Kureha Corporation, KF POLYMER)
UHPE: Ultrahigh-molecular weight polyethylene (manufactured by Mitsui Chemicals, Inc., LUBMER L3000)
POM: Polyacetal (manufactured by Asahi Kasei Corporation, TENAC LA543)

Example 8

A sample obtained by mounting pieces obtained by slicing the rubber molded article produced in Example 1 on an acrylic plate serving as a substrate was produced. The thickness of the rubber molded article constituting the sample obtained in this example was 0.3 mm.

(Evaluation concerning Rubber Molded Article)

The resultant rubber molded articles were each evaluated as described below.

(1) Evaluations of Structure and Composition

The surface state of each of the produced rubber molded articles was observed with a scanning electron microscope S-4800 (manufactured by Hitachi High-Technologies Corporation). In addition, the composition of the sea and island portions of the molded article was identified with an energy dispersive X-ray (EDX) apparatus included in the microscope. The resultant image was captured in image analysis software "Image J" (developer: Wayne Rasband, turned into an open source), and then the image was binarized so that the sea portion and the island portions were completely separated from each other. With regard to the binarized image, a correlation between the number of dots of the image and an actual size was calculated with the same image software as that described above and a self-developed program, and then a desired numerical value was calculated from the image. Then, the maximum area of the island portions, the area ratio distribution degree of the island portions, an average interadjacent wall surface distance between an island portion and another island portion, and the like were obtained from the image.

(2) Evaluation of Surface Smoothness

The surface of each of the rubber molded articles was observed with a laser microscope VK-X100 (manufactured by Keyence Corporation). Specifically, based on the image of a range measuring 1.0 mm by 1.5 mm, the surface roughness of the entirety of the surface in the image portion was calculated. 20 or more images were obtained, and a surface roughness in each of the images was calculated. Then, the average of the calculated surface roughnesses was defined as a surface roughness Ra representing the surface smoothness of the rubber molded article of interest.

(3) Evaluation of Hardness

The surface of each of the rubber molded articles was subjected to the in-plane mapping of elastic moduli with an AFM nanoindentation apparatus (scanning probe microscope manufactured by Bruker AXS). Here, a value obtained by averaging the elastic moduli of the sea portion at a midpoint between an island portion and another island portion was defined as the hardness of the sea portion, and the hardness of each of the island portions was calculated as a value obtained by averaging the elastic moduli of the centers of the island portions. When a plurality of kinds of island portions formed of different materials were present, the average of the elastic moduli of the centers of the island portions was defined as the elastic modulus of each of the island portions no matter what kind the island portions were.

(4) Evaluation of Fouling Resistance (Tackiness Evaluation)

A circular urethane rubber having a diameter of 15 mm was pressed against the surface of each of the rubber molded articles under a load of 30 N, and the resultant was left to stand for 30 seconds. Fouling resistance (tackiness) was evaluated by measuring the maximum peel force when the rubber was completely peeled.

(5) Evaluation of Friction Coefficient

A dynamic friction coefficient was measured by subjecting the surface of each of the rubber molded articles to a linear reciprocating test with a friction testing apparatus TRIBOGEAR (manufactured by Shinto Scientific Co., Ltd.). Here, a counterpart material at the time of the measurement was a SUJ2 sphere having a diameter of 10 mm, and was reciprocated under a load of 100 g at a speed of 100 mm/min in a 5-millimeter range for 1 minute. The measurement was performed in a plurality of portions of the surface of the rubber molded article, and a value obtained by averaging the dynamic friction coefficients obtained in the respective portions was defined as the dynamic friction coefficient of the sample of interest.

(6) Bending Test

Each of the sheets produced in Examples 1 to 7 and Comparative Examples 1 to 3 was subjected to a bending test. A state in which the produced rubber molded article was spread on a flat plane was defined as the starting state of the bending test, and the state was defined as a bending angle of 0°. Next, an axis at the time of bending was determined, and then the sheet was bent until an angle formed among the bent portion, the axis, and the original position became 60°. Further, the sheet was bent via a bending angle of 0° to the opposite side, i.e., until the angle became −60°, and then the sheet was returned to an angle of 0°. The foregoing series of operations was defined as one set, and the set was repeated 20 times. A portion serving as the axis to which the largest stress was considered to be applied by the bending was photographed and observed with a SEM, and the bending resistance of the sheet was identified. Here, the case where the plastic appearing in the surface of the rubber molded article did not peel was judged as ○ (satisfactory), and the case where the peeling occurred was judged as x (poor).

TABLE 2

| | Island portion area ratio [%] | Maximum area of island portions [μm²] | Ratio of island portions each satisfying $0 < w \leq 300$ μm² to total area of island portions | Average inter-adjacent wall surface distance [μm] | Area ratio distribution degree | Elastic modulus difference [MPa] | Ra [μm] |
|---|---|---|---|---|---|---|---|
| Example 1 | 19 | 4 | 100% | 0.15 | 4 | 240 | 1.2 |
| Example 2 | 9 | 4 | 100% | 0.20 | 3 | 240 | 1.1 |
| Example 3 | 31 | 25 | 100% | 0.37 | 6 | 1,200 | 1.4 |
| Example 4 | 19 | 177 | 100% | 0.25 | 5 | 240 | 1.2 |
| Example 5 | 22 | 222 | 100% | 0.38 | 6 | 1,200 | 1.4 |
| Example 6 | 25 | 158 | 100% | 0.24 | 5 | 500 | 1.3 |
| Example 7 | 30 | 242 | 100% | 0.53 | 10 | 1,200 | 1.4 |
| Example 8 | 19 | 4 | 100% | 0.15 | 4 | 240 | 1.2 |
| Comparative Example 1 | — | — | — | — | — | — | 1.2 |
| Comparative Example 2 | — | — | — | — | — | — | 1.1 |
| Comparative Example 3 | 20 | 950 | 42% | 1.9 | 22 | 250 | 1.8 |

TABLE 3

| | Peel force/N | Dynamic friction coefficient | Bending test |
|---|---|---|---|
| Example 1 | 1.7 | 0.98 | ○ |
| Example 2 | 2.0 | 1.13 | ○ |
| Example 3 | 2.1 | 0.66 | ○ |
| Example 4 | 1.4 | 0.84 | ○ |
| Example 5 | 0.1 | 0.27 | ○ |
| Example 6 | 1.6 | 0.70 | ○ |
| Example 7 | 3.9 | 1.57 | ○ |
| Comparative Example 1 | 19.3 | 2.18 | — |
| Comparative Example 2 | 23.6 | 2.42 | — |
| Comparative Example 3 | 17.2 | 2.10 | x |

Figure 3:
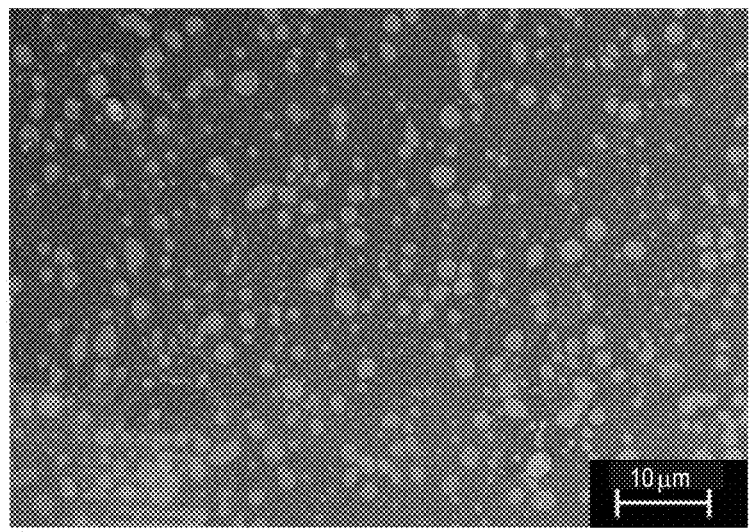
FIG. 3 is a SEM image for illustrating the surface of a rubber molded article produced in Example 1.

FIG. 3 is a SEM image for illustrating the surface of the rubber molded article produced in Example 1. As illustrated in FIG. 3, it was confirmed that a sea-island structure was present in the surface of the rubber molded article of Example 1. Although not shown in Table 3, the peel force and dynamic friction coefficient of the rubber molded article of Example 8 having the pieces each having a thickness of 0.3 μm obtained by slicing the rubber molded article of Example 1 were the same as those of Example 1.

Figure 4:
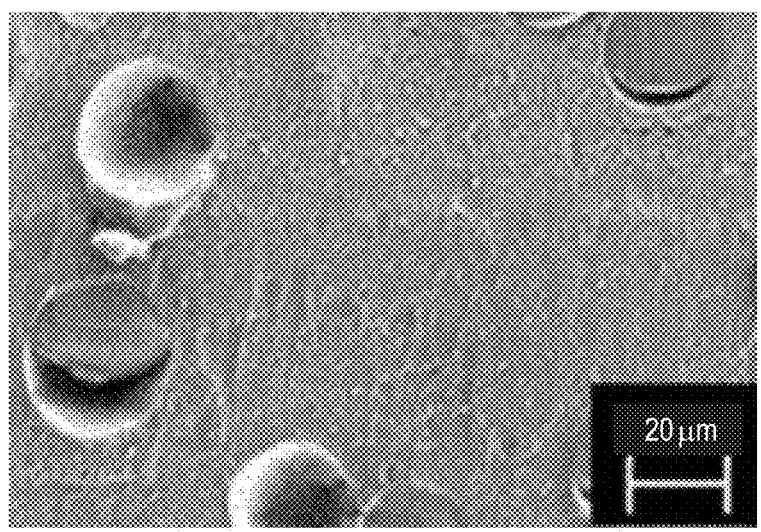
FIG. 4 is a SEM image when the sample of Comparative Example 3 is subjected to a bending test.

FIG. 4 is a SEM image when the sample of Comparative Example 3 is subjected to the bending test. As illustrated in FIG. 4, it was confirmed that when the sample of Comparative Example 3 was subjected to the bending test, the peeling of the plastic portion occurred. In Comparative Example 3, the plastic B was contained but only the preliminary kneading was performed. Accordingly, the plastic B in the rubber molded article serving as a sample had a large size and was not uniformly distributed, and hence the sample was found to be inferior in bending resistance to the samples of Examples.

According to the present invention, it is possible to provide the rubber composition for producing a rubber molded article that does not lose any general characteristic of a rubber, and is improved in fouling resistance while being reduced in tackiness and frictional force despite the presence of the rubber in its surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109853, filed May 29, 2015, which is hereby contained by reference herein in its entirety.

What is claimed is:

1. A rubber composition comprising:
a non-fluorine-based rubber A; and
a plastic B,
wherein:
the rubber A is at least one selected from the group consisting of a nitrile rubber and a styrene rubber;
the plastic B is (i) at least one selected from the group consisting of polyvinylidene fluoride and polyoxymethylene or (ii) polyvinylidene fluoride and ultrahigh-molecular weight polyethylene;
a difference in elastic modulus between the rubber A and the plastic B is 240 MPa to 1200 MPa;
a sea-island structure having a sea portion containing the rubber A and a plurality of island portions each containing the plastic B is formed;
a ratio of areas of the island portions to a sum of an area of the sea portion and the areas of the island portions is more than 9% to 25%;
90% or more of the plurality of island portions each have a volume of 4,000 μm³ or less; and
an average inter-adjacent wall surface distance of the plurality of island portions is more than 0.15 μm to 0.38 μm.

2. The rubber composition according to claim 1, wherein the rubber A has an elastic modulus of more than 0 MPa to less than 50 MPa.

3. The rubber composition according to claim 1, wherein a ratio between a melt viscosity of the rubber A at 180° C. and a melt viscosity of the plastic B at 180° C. is 3 or less.

4. The rubber composition according to claim 1, wherein a difference in solubility parameter between the rubber A and the plastic B is 14 $(J/cm^3)^{1/2}$ or less.

5. A rubber molded article, which is obtained by molding the rubber composition of claim 1, wherein in a plane in which the sea-island structure is formed, island portions each having an area of more than 0 μm² to 300 μm² out of the plurality of island portions account for 90% or more of a total area of the island portions.

6. The rubber molded article according to claim 5, wherein the plane has a surface roughness of more than 0 μm to 3 μm.

7. The rubber molded article according to claim 5, wherein all the plurality of island portions each have an area of more than 0 μm$^2$ to 300 μm$^2$.

8. A method of producing the rubber composition of claim 1, the method comprising subjecting the rubber A and the plastic B to a kneading treatment with a feedback screw.

9. A method of producing the rubber molded article of claim 5, the method comprising subjecting the rubber A and the plastic B to a kneading treatment with a feedback screw.

* * * * *